June 13, 1967  L. P. NOIROT  3,325,196
DEVICE FOR ASSEMBLING TWO PARTS HAVING BETWEEN THEM
A CONNECTION OF THE SCREW AND NUT TYPE
Filed Dec. 2, 1965

June 13, 1967 L. P. NOIROT 3,325,196
DEVICE FOR ASSEMBLING TWO PARTS HAVING BETWEEN THEM
A CONNECTION OF THE SCREW AND NUT TYPE
Filed Dec. 2, 1965 5 Sheets-Sheet 3

United States Patent Office 3,325,196
Patented June 13, 1967

3,325,196
DEVICE FOR ASSEMBLING TWO PARTS HAVING BETWEEN THEM A CONNECTION OF THE SCREW AND NUT TYPE
Louis Pierre Noirot, Maisons-Laffitte, France, assignor to Simmonds S.A., Suresnes, Seine, France, a body corporate of France
Filed Dec. 2, 1965, Ser. No. 511,101
Claims priority, application France, June 29, 1961, 866,696
4 Claims. (Cl. 287—20.3)

This is a continuation in part of my pending application dated June 25, 1962 Ser. No. 204,958 now abandoned.

The invention relates to the assembly at opposite faces of a support of two parts having screw-threaded assembly means of the screw and nut type, and it has the object of permitting, or at any rate facilitating, the assembly of the two parts, particularly in the case where the screwing of one of the parts may have the effect of causing an undesired rotation of the other part.

It is obvious that assembly is difficult if not impossible whenever said other part is free to rotate during the screwing, as a consequence of being taken or driven along by the friction of the screwthreads of the driven part against the screwthreads of the other part, where it is not possible by extrinsic means to prevent the parts from turning; for example when the part which has to be prevented from rotating is on the side of the support which is not accessible or is difficultly accessible, or when the structure of that part does not serve to prevent the rotation. This is the case in a steering knuckle, in which the ball at the inner end of the bolt is contained in a lubricated casing, constituting a ball and socket joint, so that the holding still of the casing does not prevent the rotation of the bolt.

Another example may be given wherein a pneumatic or electric screwing machine is utilized, which is to be held with both hands; the rotation of the part located at the opposite side of the support cannot then be prevented, unless a second operator holds it.

It to be remarked, for example when one of the parts is a conventional nut, which would not ordinarily take along the other part in rotation during manual screwing, may nevertheless take along said other part in rotation if the screwing is effected by a screwing machine, owing to the greater moment of inertia of the rotating parts and to necessity of a greater accelerating torque, to overcome the inertia on starting.

This disadvantage is increased if use is made of self locking or self-braking nuts, in which case the driving torque abruptly assumes a relatively considerable value at the moment when the screw comes into contact with the locking or the braking means, for example in the case of the well-known device comprising a non-threaded ring of deformable material placed in the bore of the nut.

According to the invention mechanical means are provided to apply to one of the parts an auxiliary force directed along the axis of the screw-threads, so as to bring the other part into frictional engagement with the confronting surface of the support. In these circumstances, this frictional engagement develops a resisting couple antagonistic to the driving torque, due to the friction of said other part, while screwing, against the confronting surface of the support.

According to the preferred embodiment of the invention, there is engaged between one of the parts and the confronting surface of the support a collar or skirt of a preferably truncated conical general shape and preferably made of elastic material or a coil spring, the said collar or spring bearing on one side against said part, and on the other side against the confronting surface of the support. When said part is rotated while screwing, the collar or spring tends to be deformed by crushing and thus develops an elastic force which pulls the other part, so that the latter comes into frictional engagement with a confronting surface of the support, which may be only the internal surface of the bore; whereby if, while screwing said other part tends to rotate, a frictional couple antagonistic to the driving torque is developed.

Various examples of the embodiment of the invention will now be described, although it is to be understood that it is not intended to limit the generic scope of the invention to or by the specific features of the examples selected as illustrations.

Figure 1:
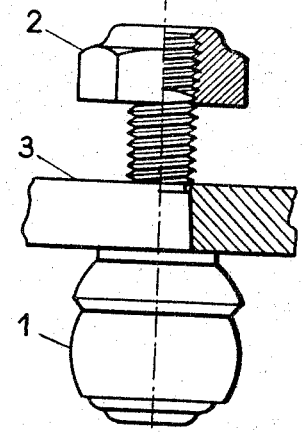
FIGURES 1 and 2 are given only for explanation's sake, each figure comprising an elevation in the left-hand half and an axial section in the right-hand half.
Figure 2:
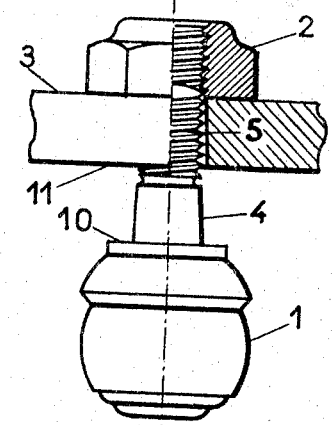

In FIGURES 1 and 2 there is shown diagrammatically a steering knuckle 1 to be mounted through a support or structural member 3, having an opening therethrough, by means of a conventional nut 2. The knuckle includes a shank portion 4 passing through the opening and a threaded portion 5 protruding from the support.

The nut being slightly engaged on the distal extremity of the threaded portion 5 as represented, if the operator releases the knuckle, it will fall into the position shown in FIG. 2 under the action of gravity, and if the nut is rotated, the knuckle is drawn along with the nut and rotates, without screwing onto the threaded portion 5. If a second operator tries to maintain the knuckle in the position of FIGURE 1, while the first operator holds the screwing machine, the ball (not shown) will be taken along by the rotation of the nut and will turn unrestrainedly in the lubricated housing 1 of the knuckle.

Figure 3:
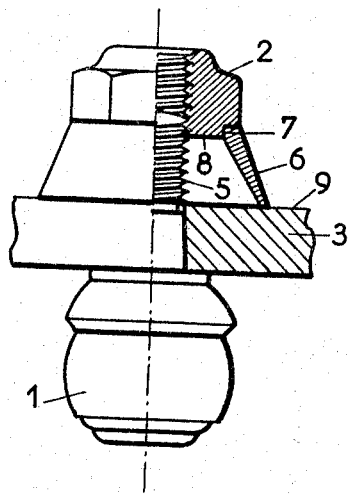
FIGURES 3 to 5 show the three stages of the mounting of a knuckle with a conventional nut.
Figure 4:
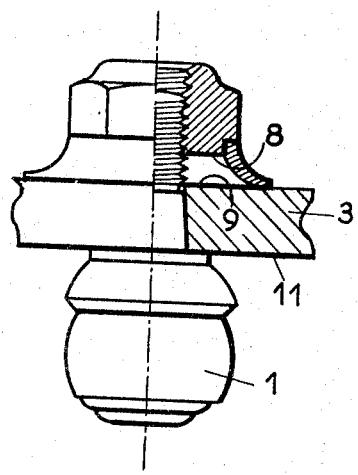
Figure 5:
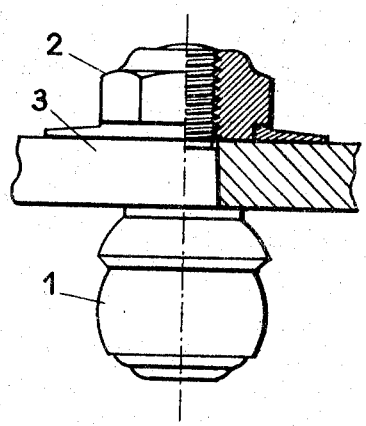

According to the invention, and as represented in FIGURES 3 to 5, a collar 6 of elastic material is interposed between the nut 2 and the surface of the support 3. The consistency of the material is such that the collar is capable of supporting the knuckle. In practice it has been found that best results are obtained with polyamide and super-polyamide resins, particularly the super polyamide known under the commercial name nylon. This collar has a truncated conical shape, the base intended to bear against the surface of the support 3 having a diameter greater than that of the base which is to bear against the face of the nut turned towards the support 3.

Although in principle it is not necessary for the collar 6 to be solid with the nut, it will be more advantageous, as has been illustrated in the figures, to cut a groove 7 on the bottom face of the nut in order to engage the small base of the collar. This collar, which will be of molded material, will preferably be given a shape such that it fits the shape of the groove. It must be engaged therein with sufficient force to develop a suitable elastic reaction to hold together, sufficiently firmly, the collar and the nut.

In addition, this arrangement has the advantage of fixing the collar in position so that when crushed it cannot become caught between the clamping face 8 of the nut and the confronting surface 9 of the support 3. It will be realized that after complete assembly the collar has completed its function, and may either be left in place or removed if preferred, depending on circumstances. However, if any part of the collar should be caught beneath surface 8, it might then or later impair the integrity of the clamping action.

Figure 6:
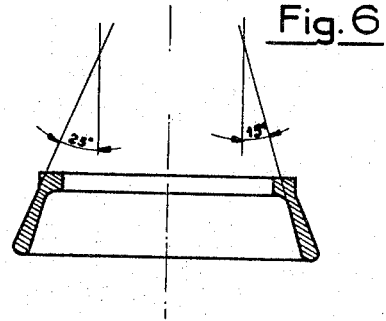
FIGURE 6 shows in section a detail of the collar.

The shape of collar which gives the best results has been shown in greater detail in FIGURE 6. With a collar of nylon it is convenient for the half-angle at the apex of the cone formed by the inside walls of the collar to be of the order of 15° or greater than 15° in order to be sure that the collar will not bend back between the lower surface 8 of the nut end and the support. Finally, the half-angle at the apex of the cone formed by the outer walls of the collar must preferably be greater than the half-angle at the apex of the cone formed by the inside walls. In the figure this half-angle is 23°, and makes it possible to give a divergent shape to the walls and more particularly on the one hand to weaken the collar near the folding point and on the other hand to give a rounded shape to the end of the walls which rubs against the surface of the support 3, thus preventing the walls from rolling up externally.

This arrangement makes it possible to have near the large base of the collar a section which increases with the height of the collar.

As will be seen in FIGURE 3, the height of the collar has been so selected that in principle, when the nut is slightly engaged on the distal end of the portion 5, the collar will be in contact with the clamping surface 8 or groove 7 of the nut end with the confronting surface 9 of the support 3, and preferably in slightly resilient contact. While screwing, the collar will be progressively deformed as has been illustrated in FIGURE 4, its large base sliding on the surface of the support 3. The collar thus spreads out in proportion as it is crushed and develops an elastic reaction which tends to lift up the nut and consequently to press the bearing surface 10 (see FIG. 2) of the knuckle against the surface 11 of the support.

In the final position shown in FIGURE 5, the collar is completely flattened on the surface of the support 3 and may be eventually removed.

It is to be noted that the invention is intended especially for standardized flow production, for example for erecting tracks and that in any case the characteristics of the collar are largely determined by the specific application, and particularly this is true as to the height of the truncated cone, the angle at the apex and the thickness and also to the resiliency of the material of the collar.

Figure 7:
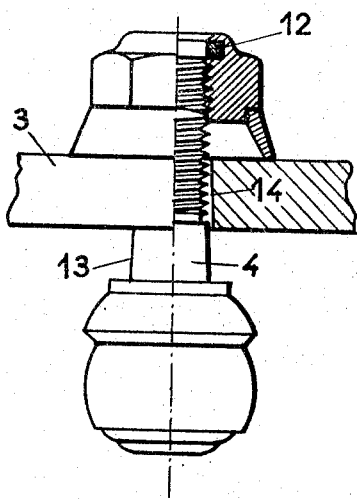
FIGURES 7 to 9 show stages of the mounting by means of a locking nut.
Figure 8:
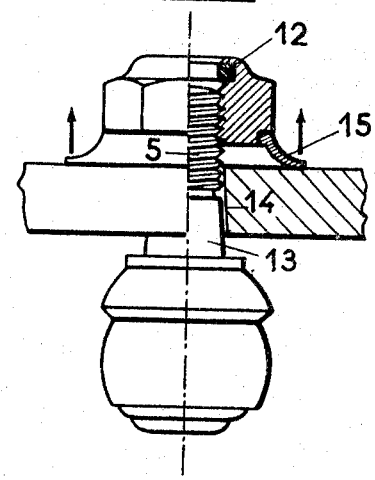
Figure 9:
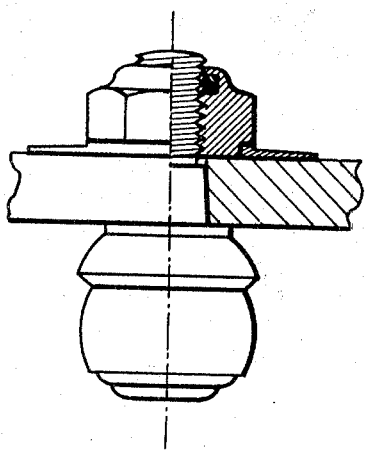

In FIGURES 7 to 9, the nut is not a conventional simple nut, but a locking nut well known in the art; it is provided with an internal non-screw-threaded ring 12 which formerly would have been made of fibre, but which at the present time is almost exclusively made of a superpolyamide, particularly the super-polyamide known under the commercial name of nylon. Furthermore, the corresponding bearing surfaces 13, 14 of the shank 4 and of the support 3 are shown as slightly conical in shape. In the present embodiment the collar 15 supports the knuckle at a distance from the support, and, while screwing, the knuckle is pulled toward its end position.

As seen in FIG. 8, when the threaded portion 5 reaches the ring 12, the collar 15 is, by this time, notably crushed, and has brought in contact the bearing surface 13 of the shank and the corresponding bearing surface 14 of the support.

Hence when the threaded portion 5 comes to engage the ring 12, the friction between said conical bearing surfaces will prevent rotation of the shank notwithstanding the strong coupling torque developed by the ring 12.

Figure 10:
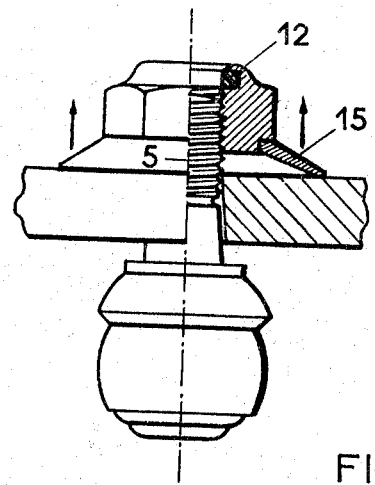
FIGURE 10 is a modification of FIGURE 7.

However, when the screwing is effected manually, it may be that the inertia of the knuckle will be sufficient to prevent rotation of the same until the threaded portion 5 reaches the ring 12. In such as case, the collar may be made shorter, as represented in FIG. 10 and will still come into action before the locking ring is reached.

Figure 11:
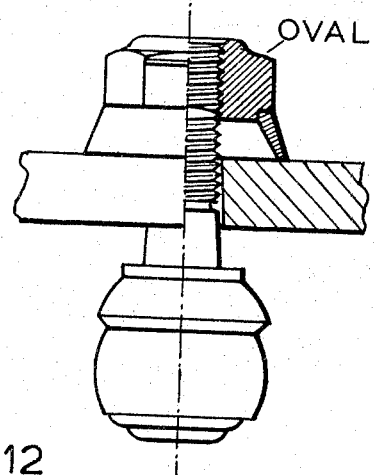
FIGURE 11 shows the mounting with another type of locking nut.
Figure 12:
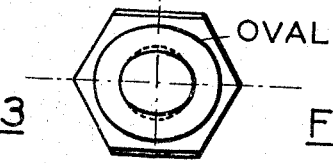
FIGURE 12 is a plan view of the locking nut of FIGURE 11.

FIGURES 11 and 12 show a locking nut known in the art having ovalized threads. As such a nut develops a very strong resisting torque, even from the beginning of the screwing, the height of the collar is made approximately equal to the protruding part of the threaded portion 5.

Figure 15:
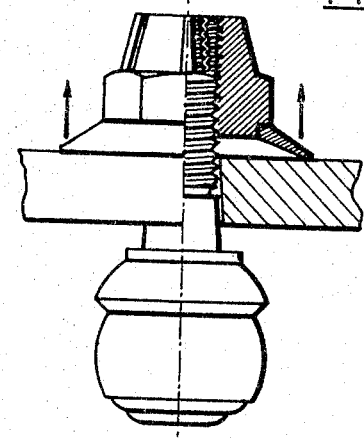
FIGURE 15 is a modification of FIGURE 13.
Figure 13:
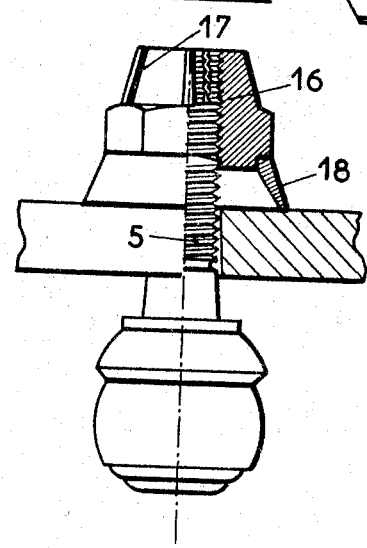
FIGURES 13, 14 show the mounting with another type of locking nut.
Figure 14:
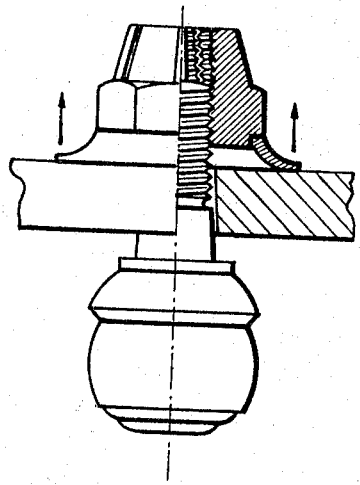

FIGURES 13, 14 shows the mounting with another known type of locking nut having an extension 16 provided with slots such as 17, said slots permitting deforming the threads in the upper part of the threaded portion of the nut. The height of the collar 18 will be substantially equal to the protruding part of the threaded portion 5, if the screwing is effected with a screwing machine. If the screwing is effected manually, the collar may be shorter, as represented in FIGURE 15.

Figure 16:
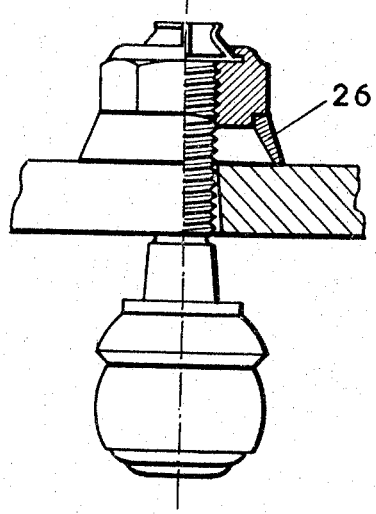
FIGURES 16 to 18 show the stages of the mounting with another type of locking nut.
Figure 17:
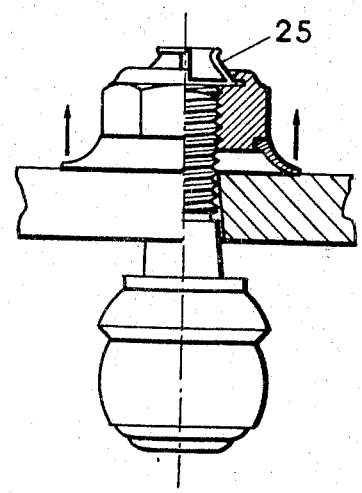
Figure 18:
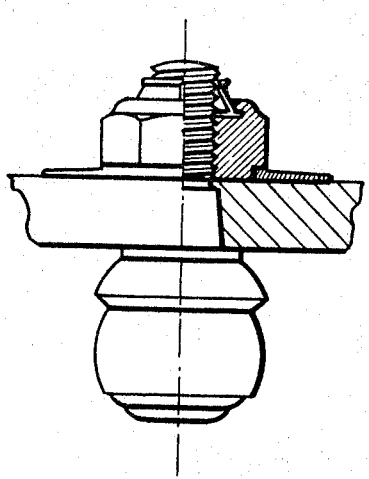
Figure 19:
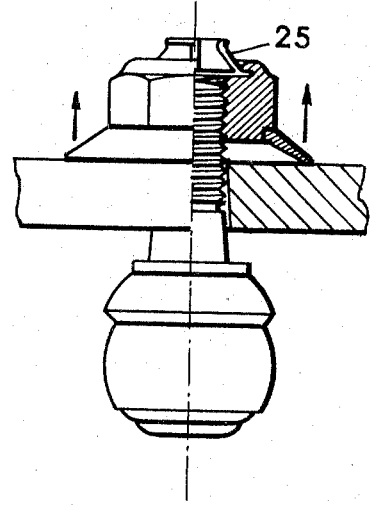
FIGURE 19 is a modification of FIGURE 16.

FIGURES 16 to 18 show the mounting with a known braking nut. In such a type of nut, braking means 25 are provided which exert a braking action on the external surface of the threads on the distal extremity of the screw. The height of the collar 26 will be substantially equal to the protruding part of the threaded portion of the screw, if the screwing is to be effected with a screwing machine. If the screwing is done manually, the collar may be shorter, as represented in FIGURE 19.

As has been stated, the invention is not limited to the examples which have just been described. As has been said, it is possible to leave the collar independent of the nut.

Figure 20:
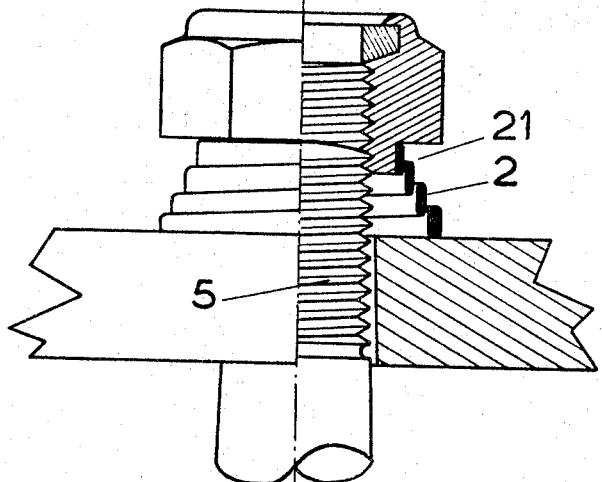
FIGURE 20 shows a modification using a spring.

It is also possible to envisage other embodiments permitting the development of an elastic reaction between the surface of the support 3 and the internal base of the nut facing the said support. As illustrated in FIGURE 20, it would be possible to envisage a coil spring 20 placed with clearance around the threaded portion 5 when the nut is placed in position, but this solution makes it necessary to provide at the base of the nut a sufficient cavity 21 to contain the spring when compressed to the maximum, in order to enable the clamping face of the nut to contact the confronting face of the support.

What I claim is:
1. In combination, a threaded fastening arrangement facilitating the assembly and tightening of a self-locking nut and bolt in circumstances wherein the bolt shank passes through a structural member and the bolt body is inaccessible to external rotational constraints, and in which at least portions of the bolt shank and the wall of the bolt opening in said member are shaped and sized to provide increasing frictional constraint on the bolt as assembly proceeds toward completion, comprising:

(a) a structural member having an opening to receive the bolt, (b) a bolt element extending on both sides of the structural member and including (1) a smooth shank portion shaped for increasing frictional engagement with the wall of said opening as the bolt is drawn through the structural member, and (2) a threaded portion of sufficient length to protrude through said member, and (c) a nut element threaded on said bolt element, its threads being sized for relatively loose initial engagement with threads of the bolt element, said nut element having secured thereto an axially resilient outwardly flared skirt depending away from the proximal face thereof, during initial engagement of said elements, in the direction towards the structural member, (d) one of said elements being provided with a deformable friction-increasing formation so located as to engage the threads of the other element following their initial loose engagement with one another during assembly, (e) the protrusion of the threaded portion of the bolt element beyond said member being less than the sum of the axial length of said skirt in its relaxed condition, measured from the proximal face of said nut, plus the axial length of the threaded portion of said one element in advance of said friction-increasing formation, and said protrusion being greater than either of said axial lengths alone, and (f) the axial compressional modulus of said skirt being such that as threading proceeds, the frictional torque resistance between the bolt and the structural member, due to the skirt's axial thrust in the direction tending to pull the bolt through the structural member, becomes greater than the frictional torque resistance due to said friction-increasing formation.

2. The combination of claim 1, in which said skirt is a frustum of a hollow cone whose wall thickness tapers outwardly from the nut element.

3. The combination of claim 1, in which said skirt is formed as a spiral coiled spring.

4. In combination, a threaded fastening arrangement facilitating the assembly and tightening of a self-locking nut and bolt in circumstances wherein the bolt shank passes through a structural member and the bolt body is inaccessible to external rotational constraints, and in which at least portions of the bolt shank and the wall of the bolt opening in said member are shaped and sized to provide increasing frictional constraint on the bolt as assembly proceeds toward completion, comprising:

(a) a structural member having a tapered opening to receive the bolt, (b) a bolt element extending on both sides of the structural member and including (1) a smooth shank portion tapered for increasing frictional engagement with the wall of said opening as the bolt is drawn through the structural member, and (2) a threaded portion of sufficient length to protrude through said member, and (c) a nut element threaded on said bolt element, its threads being sized for relatively loose initial engagement with the threads of the bolt element, said nut element having secured thereto an axially-resilient outwardly flared skirt depending away from the proximal face thereof, during initial engagement of said elements, in the direction towards the structural member;

(d) said nut element being provided with a deformable friction-increasing plastic insert so located as to engage the threads of the bolt element following their initial loose engagement with one another during assembly, (e) the protrusion of the threaded portion of the bolt element beyond said member being less than the sum of the axial length of said skirt in its relaxed condition, measured from the proximal face of said nut, plus the axial length of the threaded portion of said nut element in advance of said plastic insert, and said protrusion being greater than either of said axial lengths alone, and (f) the axial compressional modulus of said skirt being such that as threading proceeds, the frictional torque resistance between the bolt and the structural member, due to the skirt's axial thrust in the direction tending to pull the bolt through the structural member, becomes greater than the frictional torque resistance due to said friction-increasing plastic insert.

References Cited

UNITED STATES PATENTS

| 1,641,059 | 8/1927 | Tausch | 151—38 |
| 2,587,134 | 2/1952 | Flora | 151—7 |
| 2,588,372 | 3/1952 | Erb | 151—7 |
| 2,885,248 | 5/1959 | White | 287—87 |
| 3,016,941 | 1/1962 | Coldren | 151—38 |
| 3,034,611 | 5/1962 | Zenzic. | |
| 3,110,212 | 11/1963 | Wing et al. | |

FOREIGN PATENTS 467,910  3/1927  Germany.

CARL W. TOMLIN, *Primary Examiner.*

M. PARSONS, Jr., *Assistant Examiner.*